United States Patent [19]

Boggs

[11] Patent Number: 4,553,790
[45] Date of Patent: Nov. 19, 1985

[54] FLEXIBLE DIRT GUARD WITH BACK-UP PLATE FOR TRACK-TYPE VEHICLE

[75] Inventor: Roger L. Boggs, East Peoria, Ill.
[73] Assignee: Caterpillar Tractor Co., Peoria, Ill.
[21] Appl. No.: 648,233
[22] Filed: Jan. 29, 1982
[51] Int. Cl.[4] .................. B62D 55/10; B62D 55/16
[52] U.S. Cl. .................................. 305/12; 305/28
[58] Field of Search .................. 305/11, 12, 22, 24, 305/27, 28

[56] References Cited

U.S. PATENT DOCUMENTS

| 1,992,702 | 2/1935 | Koop | 305/12 |
| 2,049,693 | 8/1936 | Eberhard | 305/12 |
| 2,780,500 | 2/1957 | Lawson | 305/12 |

FOREIGN PATENT DOCUMENTS

| 2905991 | 8/1979 | Fed. Rep. of Germany | 305/12 |
| 2018209 | 10/1979 | United Kingdom | 305/12 |

*Primary Examiner*—David A. Scherbel
*Attorney, Agent, or Firm*—Phillips, Moore, Lempio & Finley

[57] ABSTRACT

The compaction of foreign materials in the track assembly (15) of a track-type vehicle (10) tends to subject the track assembly (15) to unduly high tensions. Such compaction can severely curtail the service lives of undercarriage components. Although flexible guards (26) function well during normal operation, when the vehicle (10) engages an immovable object, the track assembly (15) tends to separate-away from said track roller frame (13). An imposition of an outside force ($F_H$) on the flexible guard could cause it to bind within the track assembly (15). This invention is directed to a backup plate (35) secured on the track roller frame (13) for preventing inward movement of the flexible guard (26) substantially within the confines of the track assembly (15) during this condition of vehicle operation.

11 Claims, 4 Drawing Figures

FLEXIBLE DIRT GUARD WITH BACK-UP PLATE FOR TRACK-TYPE VEHICLE

DESCRIPTION

1. Technical Field

This invention relates generally to a dirt guard for a track-type vehicle and more particularly to means for preventing inward movement of a flexible guard into the confines of a track assembly.

2. Background Art

Track-type vehicles, such as crawler tractors, are normally operated in dirt and debris-laden environments. Compaction of foreign materials in the track assembly of such a vehicle tends to unduly increase track tension and causes wear and inculcation of undercarriage components. As a result, the service lives of such components are greatly reduced.

One solution to the above compaction and wear problems is to provide guards on the outboard and inboard sides of the vehicle's undercarriage to cover spaces defined between the track roller frame, track rollers, and endless track of the undercarriage. Rigid metal guard plates, secured on the track roller frame, have found application to "hard" (unsuspended) undercarriages. However, when the undercarriage is of the "soft" or resilient (suspended) type, the rigid guards may prove inappropriate.

A solution to the latter problem has been the development of a flexible guard having its upper end secured on the track roller frame and suspended thereunder to prevent the ingress of foreign materials into the track assembly. A problem encountered with this type of flexible guard occurs when the track separates from the track roller frame during operation of the vehicle and defines a space between an adjacent pair of track rollers and the track that is greater than adjacent outer dimensions of the flexible guard. During this condition of vehicle operation, the guard could be impacted and displaced laterally inwardly within the track assembly and bind therein when the track assembly assumes its normal, operating position.

The present invention is directed to overcoming one or more of the problems as set forth above.

DISCLOSURE OF INVENTION

In one aspect of the present invention, a track-type vehicle has a track roller frame, an endless track assembly mounted on the frame, a plurality of track rollers engaging the track assembly, and at least one flexible guard mounted at its upper end on the track roller frame and disposed between a laterally adjacent pair of track rollers to prevent the ingress of foreign materials within the confines of the track assembly. The improvement comprises backup means for preventing inward movement of the flexible guard substantially within the confines of the track assembly when the track assembly separates from the track roller frame during operation of the vehicle to define a space between the adjacent pair of track rollers and the track assembly that is greater than adjacent outer dimensions of the flexible guard.

The above-discussed compaction and wear problems are thus substantially eliminated to prolong the service lives of undercarriage components of the vehicle.

BRIEF DESCRIPTION OF THE DRAWINGS

Other objects and advantages of this invention will become apparent from the following description and accompanying drawings wherein.

BEST MODE OF CARRYING OUT THE INVENTION

Figure 1:
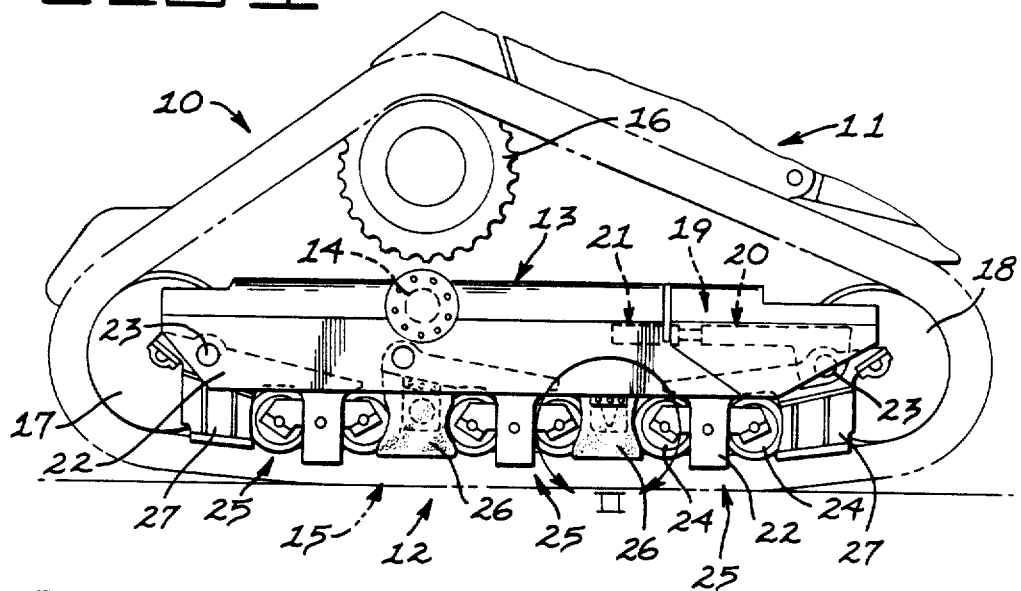
FIG. 1 is a partial side elevational view of a track-type vehicle employing a backup member of the present invention therein for controlling inward movement of a flexible guard.

FIG. 1 partially illustrates a track-type vehicle 10, such as a crawler tractor, including a chassis 11 and an undercarriage 12. A pair of laterally-spaced track roller frames 13 (one shown) are pivotally mounted on opposite sides of a main frame of the chassis by stub shafts 14. An endless track assembly 15 is mounted on each track roller frame and is entrained about a drive sprocket 16, a rear track idler 17, and a front track idler 18.

Front track idler 18 is mounted forwardly on the track roller frame and positionable thereon, under control of a recoil system, generally shown at 19. The recoil system includes a slider assembly 20, slidably mounted on the track roller frame, and a hydraulic recoil cylinder 21 (or mechanical coil spring) for absorbing shock loads imposed on the track idler. The recoil system further functions to relieve high track tension caused by the compaction of material or debris in the track assembly. As described more fully hereinafter, this invention aids in eliminating the ingress of foreign materials into the track assembly to avoid the compaction problem. In fact, it would prove highly desirable to eliminate the recoil system, if possible, to thus substantially reduce the overall cost and complexity of the undercarriage.

As further shown in FIG. 1, front track idler 18 is rotatably mounted on a bogey arm 22, pivotally mounted on slider assembly 20 by a pin 23. The opposite end of the arm has a pair of track rollers 24 pivotally and rotatably mounted thereon in a conventional manner to provide an integrated bogey arrangement 25 for a "soft" or resilient suspension system for the undercarriage. The rearward-most and intermediate bogey arrangements 25 are substantially similar to the forward-most bogey arrangement, except that the former bogey arrangements are mounted directly on track roller frame 13 by pins 23.

During normal operation of vehicle 10, a plurality of strategically arranged flexible guards 26 will function to prevent the ingress of foreign materials substantially within the confines of track assembly 15. In addition, a pair of rigid metallic guards 27 are each secured to a respective crank or bogey arm 22. A clamping plate 28 (FIG. 3) releasably clamps each flexible guard to track roller frame 13 by a plurality of fastening means, shown in the form of bolts 29. In particular, a cross plate 30 of the tractor roller frame is secured, such as by welding, to a downwardly extending flange 31 having the flexible guard releasably attached thereon by the clamping plate and bolts.

Figure 2:
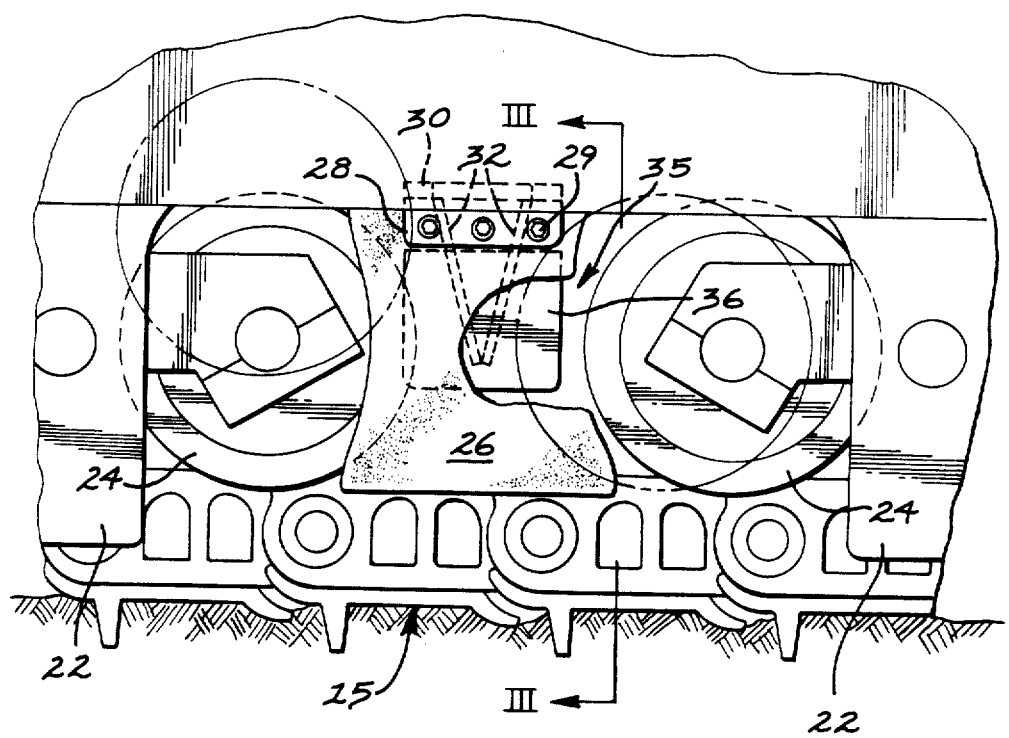
FIG. 2 is an enlarged side elevational view, illustrating the relative positioning of the backup member and the flexible guard.

In the preferred embodiment of this invention, a flexible guard 26 composed of a reinforced elastomeric material is attached both on the inboard side of the track assembly adjacent to the main frame of the vehicle (not shown), and on an outboard side of the track roller frame (FIG. 3), respectively. A pair of support plates 32 are welded or otherwise suitably secured to flanges 31 and to cross plate 30. As shown in FIG. 2, the support plates preferably converge downwardly toward each other to prevent their interference with the track rollers.

Figure 3:
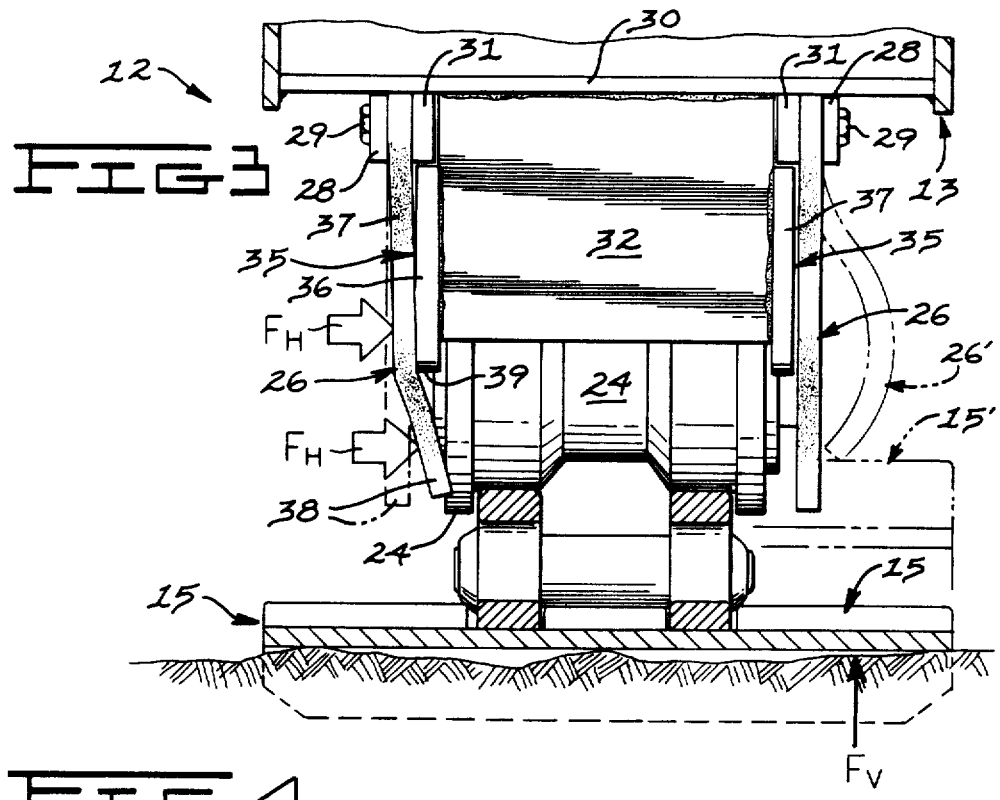
FIG. 3 is a sectional view showing the backup member and the flexible guard in end elevation with the view being taken in the direction of arrows III—III in FIG. 2.

As shown in FIG. 3, flexible guards 26 normally function efficiently when subjected to vertical forces $F_V$, whereby the inboard flexible guard is pushed upwardly and flexes outwardly to its 26' position. In particular, when the track assembly moves upwardly towards track roller frame 13, flexible guard 26 will flex and bow to continuously cover this exposed side area of the undercarriage. Likewise and as further shown in FIG. 3, horizontal forces $F_H$ imposed on the outboard flexible guard will tend to flex the guard inwardly during normal operation, whereby the guard will engage the adjacent pair of track rollers 24 or track links, for example, to prevent the guard from moving substantially into the confines of the track assembly.

Figure 4:
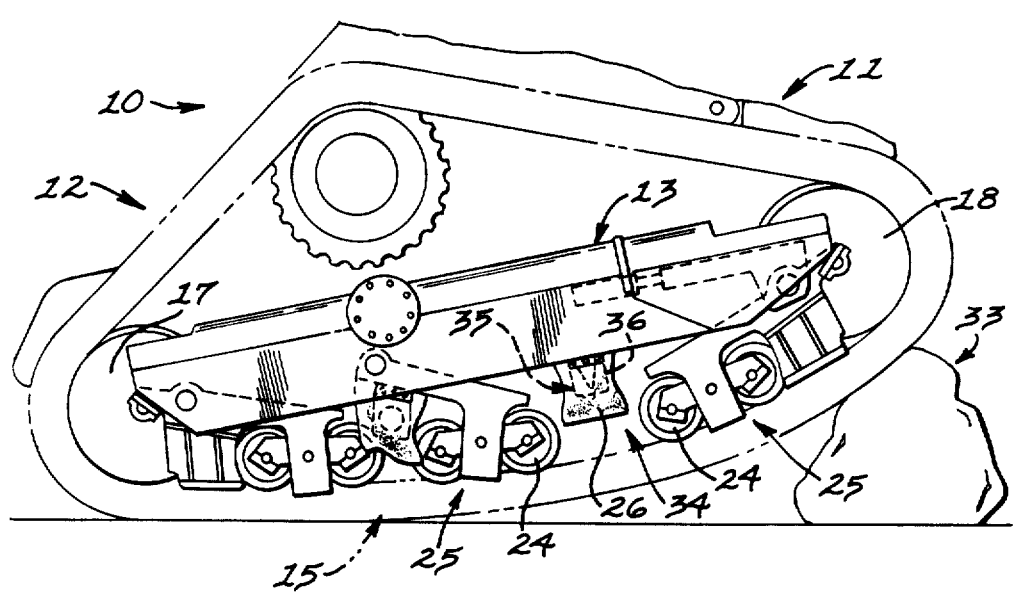
FIG. 4 is a view similar to FIG. 1, but showing the vehicle engaging a stationary object whereby the track assembly separates from the track roller frame of the vehicle.

However and as shown in FIG. 4, when the vehicle engages an immovable object 33, such as a tree stump or rock, during a log-skidding operation, for example, the track assembly will separate from the track roller frame and rollers 24 will pivot to define a space 34 between the adjacent pair of track rollers 24, the lower edge of flexible guard 26, and the track assembly. Since this space is greater than the adjacent outer dimensions of the guard, imposition of force $F_H$ on one or more of the guards could pose a binding problem when the vehicle assumes normal operation.

This invention is primarily directed to overcoming this problem by providing a backup means 35 for preventing inward movement of each flexible guard 26 substantially within the confines of track assembly 15 when the track assembly separates from the track roller frame to define space 34. In the preferred embodiment illustrated, each backup means 35 includes a backup plate 36 secured to an outer, lateral end of each support plate 32. It should be particularly noted that the backup plate is welded or otherwise suitably secured to support plates 32, but is not secured to overlying flexible guard 26. This permits the guard to bow and flex to its 26' position, illustrated by the inboard guard in FIG. 3. In addition, it induces the guard to flex outwardly, rather than inwardly.

It should be further noted in FIG. 3 that an upper or minor portion 37 of the guard, engaging backup plate 36, is substantially longer than a lower or minor portion 38 thereof. As illustrated by the outboard guard in FIG. 3, this arrangement will induce inward bending of only minor portion 38 of the guard at a pivot line defined by a lower edge 39 of the backup plate. This construction and arrangement will prevent force $F_H$ from pushing the guard substantially within the confines of the track assembly, particularly when the track assembly separates from the track roller frame, as shown in FIG. 4.

Industrial Applicability

Applicant's improved guard assembly, including flexible guards 26 and backup means 35, finds particular application to endless track-type vehicles, such as crawler tractors, employed for log-skidding operations or the like. In operations of this type, the compaction of foreign materials in the track assembly can create high track tensions and related problems, which could cause undue wear of undercarriage components.

In operation, and when vehicle 10 engages a tree stump or boulder 33', as illustrated in FIG. 4, track assembly 15 will tend to separate from track roller frame 14 to define a space 34 between adjacent rollers 24, the lower edge of guard 26, and the track assembly. Imposition of an extraneous force $F_H$ (FIG. 3) on the guard (absent backup means 35) would tend to push the guard substantially within the confines of the track assembly. When the obstacle is removed and the vehicle again assumes its normal operating position shown in FIG. 1, flexible guard 26 could bind within the track assembly to create an unfavorable condition.

As discussed above, the provision of backup means 35 prevents this possibility by engaging a major portion 37 of the guard (FIG. 3) and permitting only inward flexing of a minor portion 38 thereof at the juncture of the portions adjacent to edge 39. However, the backup means will not interfere with normal flexing of the guard between its full-line position 26 and phantom-line position 26' (FIG. 3) when the track assembly is impacted with an upwardly directed force $F_V$.

Other aspects, objects, and advantages of this invention can be obtained from a study of the drawings, the description, and the appended claims.

I claim:

1. In a track-type vehicle having a track roller frame (13), an endless track assembly (15) mounted on said frame (13), a plurality of track rollers (24) mounted below said frame (13) to engage said track assembly (15), and at least one flexible guard (26) mounted at its upper end on said track roller frame (13) and suspended downwardly between a laterally adjacent pair of rollers (24) to prevent the ingress and compaction of materials within the confines of said track assembly (15), the improvement comprising:

backup means (35) for preventing inward movement of said flexible guard (26) substantially within the confines of said track assembly (15) when said track assembly (15) separates from said track roller frame (13) during operation of said vehicle (10) to define a space (34) between said pair of track rollers (24) and said track assembly (15) that is greater than adjacent outer dimensions of said flexible guard (26).

2. The vehicle of claim 1 wherein at least some of said track rollers (24) are mounted on bogey arms (22) of a resilient suspension system to permit said track assembly (15) to separate from said frame (13) to define said space (34).

3. The vehicle of claim 1 wherein said flexible guard (26) defines an upper major portion (37) having its upper end secured on said track roller frame (15) to suspend said guard (26) therefrom and a lower minor portion (38) connected to said major portion (37), said backup means (35) including a lower edge (39) positioned at the juncture of the major (37) and minor (38) portions of said guard (26) and extending thereacross to permit only inward flexing of said minor portion (38) relative to said major portion (37).

4. The vehicle of claim 3 wherein said backup means (35) includes an at least generally vertically disposed plate (36) secured on said track roller frame (13) and abutting a back side of the major portion (37) of said guard (26) in unsecured relationship therewith.

5. The vehicle of claim 3 further including a cross plate (30) secured on said track roller frame (13), a flange (31) extending downwardly from said cross plate (30), and wherein an upper end of said flexible guard (26) is releasably attached to said flange (31).

6. The vehicle of claim 3 further including a cross plate (30) secured on said track roller frame (13) and having a pair of laterally spaced flexible guards (26) mounted at their upper ends on said cross plate (30) and extending downwardly on opposite sides of said track rollers (24) and wherein said backup means (35) includes at least one support plate (32) secured to said cross plate (30) to extend downwardly therefrom and a backup plate (36) secured on each lateral end of said support plate (32) to engage a back side of the major portion (37) of a respective one of said flexible guards (26).

7. A track-type vehicle (10) comprising:
a chassis (11),
an undercarriage (12) including,
a pair of track roller frames (13) mounted on opposite sides of said chassis (11),
an endless track assembly (15) mounted on each of said track roller frames (13),
a plurality of bogey arrangements (25) movably mounted on said track roller frame (13) and including a plurality of track rollers (24) engaging said track assembly (15) to provide a resilient suspension system,
a plurality of flexible guards (26) each mounted at its upper end on said track roller frame (13) and extending downwardly therefrom between a laterally adjacent pair of rollers (24) of a respective adjacent pair of said bogey arrangements (25), and
backup means (35) for preventing inward movement of each of said flexible guards (26) substantially within the confines of said track assembly (15) when said track assembly (15) separates from said track roller frame (13) during operation of said vehicle (10) to define a space between said pair of track rollers (246) and said track assembly (15) that is greater than adjacent outer dimensions of said flexible guard (26).

8. The vehicle of claim 7 wherein each said flexible guard (26) defines an upper major portion (37) having its upper end secured on said track roller frame (15) to suspend said guard (26) therefrom and a lower minor portion (38) connected to said major portion (37), said backup means (35) including a lower edge (39) positioned at the juncture of the major (37) and minor (38) portions of said guard (26) and extending thereacross to permit only inward flexing of said minor portion (38) relative to said major portion (37).

9. The vehicle of claim 8 wherein said backup means (35) includes an at least generally vertically disposed plate (36) secured on said track roller frame (13) and abutting a back side of the major portion (37) of said guard (26) in unsecured relationship therewith.

10. The vehicle of claim 8 further including a cross plate (30) secured on said track roller frame (13), a flange (31) extending downwardly from said cross plate (30), and wherein an upper end of said flexible guard (26) is releasably attached to said flange (31).

11. The vehicle of claim 8 further including a cross plate (30) secured on said track roller frame (13) and having a pair of laterally spaced flexible guards (26) mounted at their upper ends on said cross plate (30) and extending downwardly on opposite sides of said track rollers (24) and wherein said backup means (35) includes at least one support plate (32) secured to said cross plate (30) to extend downwardly therefrom and a backup plate (36) secured on each lateral end of said support plate (32) to engage a back side of the major portion (37) of a respective one of said flexible guards (26).

* * * * *